(12) United States Patent  
Agombar et al.

(10) Patent No.: US 7,793,144 B2  
(45) Date of Patent: *Sep. 7, 2010

(54) STORAGE SYSTEM WITH CASCADED COPY TARGETING AND ENHANCED INTEGRITY

(75) Inventors: John Paul Agombar, Hampshire (GB); Christopher Barry Edgar Beeken, Hampshire (GB); Carlos Francisco Fuente, Hampshire (GB); Simon Walsh, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/243,450

(22) Filed: Oct. 1, 2008

(65) Prior Publication Data

US 2009/0037766 A1     Feb. 5, 2009

Related U.S. Application Data

(63) Continuation of application No. 11/339,094, filed on Jan. 24, 2006, now Pat. No. 7,509,523.

(30) Foreign Application Priority Data

Mar. 2, 2005   (GB)  .................... 0504390.6

(51) Int. Cl.  
*G06F 11/00*    (2006.01)

(52) U.S. Cl. .............. 714/5; 714/4; 714/6; 714/7; 714/8

(58) Field of Classification Search ........... 714/4, 714/5, 6, 7, 8  
See application file for complete search history.

(56) References Cited

U.S. PATENT DOCUMENTS

2003/0191916 A1   10/2003   McBrearty et al. .......... 711/162  
2006/0143413 A1   6/2006   Agombar et al. ............ 711/162

*Primary Examiner*—Robert Beausoliel  
*Assistant Examiner*—Charles Ehne  
(74) *Attorney, Agent, or Firm*—Harrington & Smith (57) ABSTRACT

A storage controller includes an interface to host computer apparatus and an interface to a plurality of controlled storage apparatus. The storage controller comprises a host write component operable to send a request to write a data object to a source data image at one of said plurality of controlled storage apparatus; a copy component operable in response to a metadata state to control copying of said data object to a target data image in a delimited sequence of data images in a cascade at said plurality of controlled storage apparatus and a fill-in component operable in response to detection of an offline condition of a disk containing said target data image to control substitution of a fill-in disk in place of said disk containing said target data image.

15 Claims, 4 Drawing Sheets

STORAGE SYSTEM WITH CASCADED COPY TARGETING AND ENHANCED INTEGRITY

CROSS REFERENCE TO RELATED APPLICATION

This patent application is a continuation application of U.S. application Ser. No. 11/339,094, filed Jan. 24, 2006 now U.S. Pat. No. 7,509,523, which claims priority to Great Britain Patent Application Number 0504390.6 filed on Mar. 2, 2005, the disclosure of which is incorporated by reference in its entirety.

FIELD OF THE INVENTION

The present invention relates to the field of computer storage systems, and particularly to advanced function storage systems providing a FlashCopy® function or the equivalent (FlashCopy is a Registered Trade Mark of International Business Machines Corporation.)

BACKGROUND OF THE INVENTION

In the field of computer storage systems, there is increasing demand for what have come to be described as "advanced functions". Such functions go beyond the simple I/O functions of conventional storage controller systems. Advanced functions are well known in the art and depend on the control of metadata used to retain state data about the real or "user" data stored in the system. The manipulations available using advanced functions enable various actions to be applied quickly to virtual images of data, while leaving the real data available for use by user applications. One such well-known advanced function is FlashCopy.

At the highest level, FlashCopy is a function where a second image of 'some data' is made available. This function is sometimes known in other system contexts as Point-In-Time copy, or T0-copy. The second image's contents are initially identical to that of the first. The second image is made available 'instantly'. In practical terms this means that the second image is made available in much less time than would be required to create a true, separate, physical copy, and that this means that it can be established without unacceptable disruption to a using application's operation. Once established, the second copy can be used for a number of purposes including performing backups, system trials and data mining. The first copy continues to be used for its original purpose by the original using application.

FlashCopy implementations achieve the illusion of the existence of a second image by redirecting read I/O addressed to the second image (henceforth Target) to the original image (henceforth Source), unless that region has been subject to a write. Where a region has been the subject of a write (to either Source or Target), to maintain the illusion that both Source and Target own their own copy of the data, a process is invoked which suspends the operation of the write command, and without it having taken effect, issues a read of the affected region from the Source, applies the read data to the Target with a write, then (and only if all steps were successful) releases the suspended write. Subsequent writes to the same region do not need to be suspended since the Target will already have its own copy of the data. This copy-on-write technique is well known and is used in many environments. All implementations of FlashCopy rely on a data structure which governs the decisions discussed above, namely, the decision as to whether reads received at the Target are issued to the Source or the Target, and the decision as to whether a write must be suspended to allow the copy-on-write to take place. The data structure essentially tracks the regions or grains of data that have been copied from source to target, as distinct from those that have not. In its simplest form, this data structure is maintained in the form of a bitmap showing which grains have been written to, and which are untouched by write activity.

Figure 1:
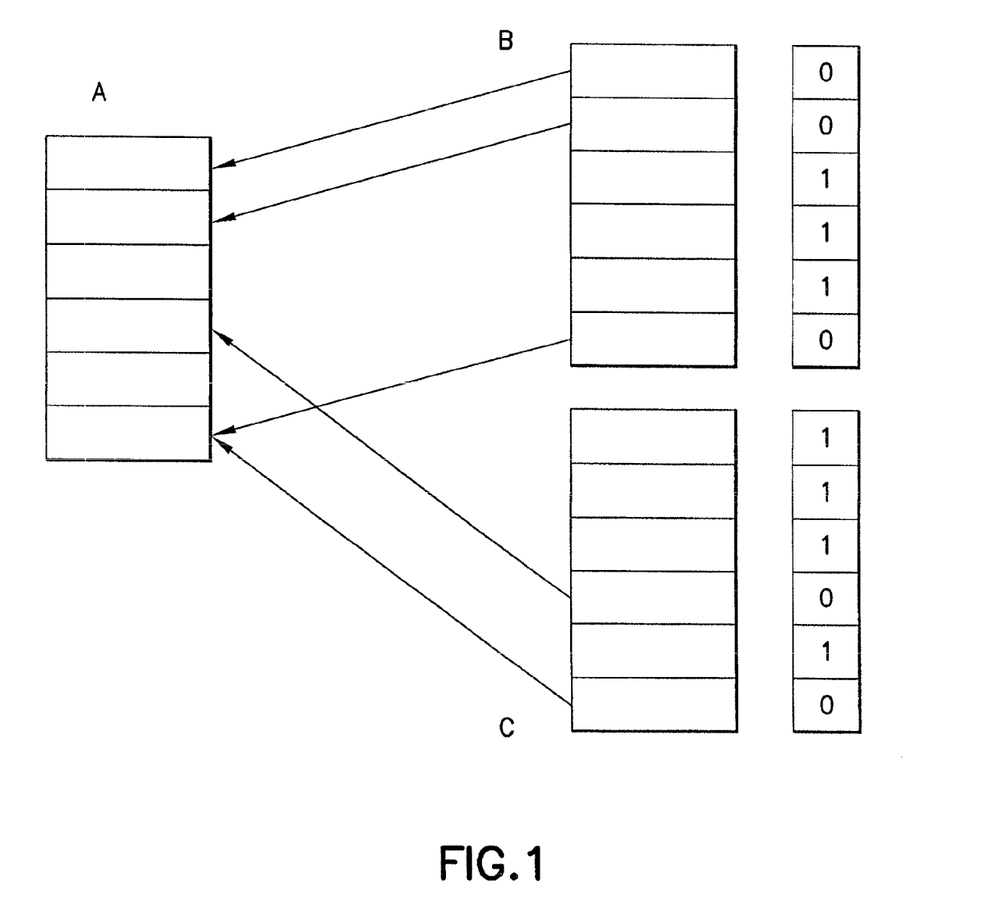
FIG. 1 shows a prior art data arrangement having multiple parallel targets.

Some storage controllers allow a user to configure more than one target for a given source. This has a number of applications. For instance, different experiments could be run against each of the targets. Or the targets might be taken at different times (e.g. different days in the week), and allow historical access to the disk, perhaps for the purpose of recovering from some data corruption, such as might be caused by a virus. Existing implementations of multiple target FlashCopy extend the FlashCopy algorithm, by configuring the disks as shown in FIG. 1, where A is a source LOGICAL UNIT, and B and C show two targets that were taken at some time in the past. A, B and C can each be updated. The arrows show grains (fixed sized regions of the disk) which are still directly dependent on the source LOGICAL UNIT. These have corresponding bits of '0b' in the bitmap which tracks the progress of each FlashCopy. This conventional algorithm simply arranges the multiple targets in parallel, and operates the original FlashCopy algorithm over each mapping in turn. This has a drawback in that writes to a grain in the source might split multiple grains (one in each relationship). The last grain in the above example would be one. This causes extra processing and latency, and may limit the scalability of the multiple FlashCopy arrangement, and hence its usability.

It is possible to provide an arrangement which structures the FlashCopy mappings in a cascade and then functions to ensure that the number of writes needed for any host I/O is bounded at 2, regardless of the number of target disks in the cascade. Such an arrangement, however, does not allow for the situation in which a set of cascade relationships is broken by a disk failure (or other disk offline condition) somewhere in the cascade. Thus, one respect in which cascaded FlashCopy targets are inferior to the conventional scheme is that the data on a cascaded target is dependent on all the disks above it—not just the source as in the conventional scheme. If the source disk becomes inaccessible (the disk fails or otherwise goes offline) it is reasonable to expect the target disks to become inaccessible. However, if a target disk becomes inaccessible (the disk fails or otherwise goes offline) it is not reasonable for all other disks in the cascade to become inaccessible because this is contrary to the user's view of the copies being made.

A further refinement to the above scheme provides a storage controller having control components (which may be implemented in hardware, software or a combination of these) capable of applying rule-based logic to provide a system in which a cascade may be divided into a plurality of sequences, and in which original data from the source is preferentially cascaded to attempt to ensure preservation of a copy of the original data in at least one member of each sequence.

Using this refinement of the technique, if data is removed from the source disk of the cascade, in the majority of cases the data will be maintained on a number of downstream disks. The number of copies (N) of the data can be chosen from within the range N=2 to (number of disks in the cascade−1). In this way it may be guaranteed that if up to N−1 disks in the cascade (excluding the source of the cascade which is treated differently) become inaccessible the data for all the disks in the cascade can be extracted from the other disks. When a disk becomes inaccessible a recovery procedure is activated to ensure that multiple copies of the data are held on the remaining disks within the cascade. Thus, provided that too many multiple failures are not experienced in quick succession, the cascade will still be able to cope with a disk failure.

A problem then arises in that if a disk becomes inaccessible, even for a short length of time, it must be removed from the cascade. The disk may be complete at the point it became inaccessible. However, the rest of the chain may have moved on because writes to other disks in the chain may have caused the original data for any given grain to move down the chain, and the data held on the offline disk is now redundant from the point of view of the remainder of the cascade.

SUMMARY OF THE INVENTION

In accordance with an exemplary embodiment thereof the invention provides a storage controller having an interface to host computer apparatus and an interface to a plurality of controlled storage apparatus, and comprising a host write component operable to send a request to write a data object to a source data image at one of said plurality of controlled storage apparatus; a copy component operable in response to a metadata state to control copying of said data object to a target data image in a delimited sequence of data images in a cascade at said plurality of controlled storage apparatus; and a fill-in component operable in response to detection of an offline condition of a disk containing said target data image to control substitution of a fill-in disk in place of said disk containing said target data image.

In accordance with another exemplary embodiment thereof the invention provides a method of operation of a storage controller having an interface to a host computer apparatus and an interface to a plurality of controlled storage apparatus, and comprising writing, by a host write component, a data object to a source data image at one of said plurality of controlled storage apparatus; controlling copying, by a copy component responsive to a metadata state, of said data object to a target data image in a delimited sequence of data images in a cascade at said plurality of controlled storage apparatus; and responsive to detection of an offline condition of a disk containing said target data image, controlling, by a fill-in component, substitution of a fill-in disk in place of said disk containing said target data image.

In accordance with another exemplary embodiment thereof the invention provides a computer program comprising computer program code to, when loaded into a computer and executed thereon, cause said computer to operate as a storage controller and to perform operations comprising writing, by a host write component, a data object to a source data image at one of a plurality of controlled storage apparatus; controlling copying, by a copy component responsive to a metadata state, of said data object to a target data image in a delimited sequence of data images in a cascade at said plurality of controlled storage apparatus; and responsive to detection of an offline condition of a disk containing said target data image, controlling, by a fill-in component, substitution of a fill-in disk in place of said disk containing said target data image.

In accordance with still another exemplary embodiment thereof the invention provides a storage controller comprising an interface to a host computer apparatus and an interface to a plurality of controlled storage apparatus, and comprising a write component operable to send a request to write a data object to a source data image at one of said plurality of controlled storage apparatus; a copy control component operable in response to a metadata state to control copying of said data object to a target data image in a delimited sequence of data images in a cascade at said plurality of controlled storage apparatus; and a substitution component operable in response to a detection of an offline condition of a disk (A) containing said target data image to control substitution of a fill-in disk (F) in place of said disk containing said target data image. The substitution component is further operable, in response to detection of the offline condition of A, to impose a first rule on subsequent writes to A that have resulted from writes to other disks, the first rule governing which bitmaps to use in order to decide the state of a grain and being expressible as:

```
if grain on F is Blank Data then
    use bitmaps for A
else
    use bitmaps for F
record the effect of the write (if any) in the bitmaps of F
``` and to impose a second rule on subsequent writes to A expressible as:

```
if A is inaccessible then
    all writes to A are failed
else
    all writes are redirected to F and
    the bitmaps of F are changed to record the effect of the write.
```

BRIEF DESCRIPTION OF THE DRAWINGS

The exemplary embodiments of the present invention will now be described by way of example only, with reference to the accompanying drawings, in which.

DETAILED DESCRIPTION OF THE PREFERRED EMBODIMENTS

Figure 2A:
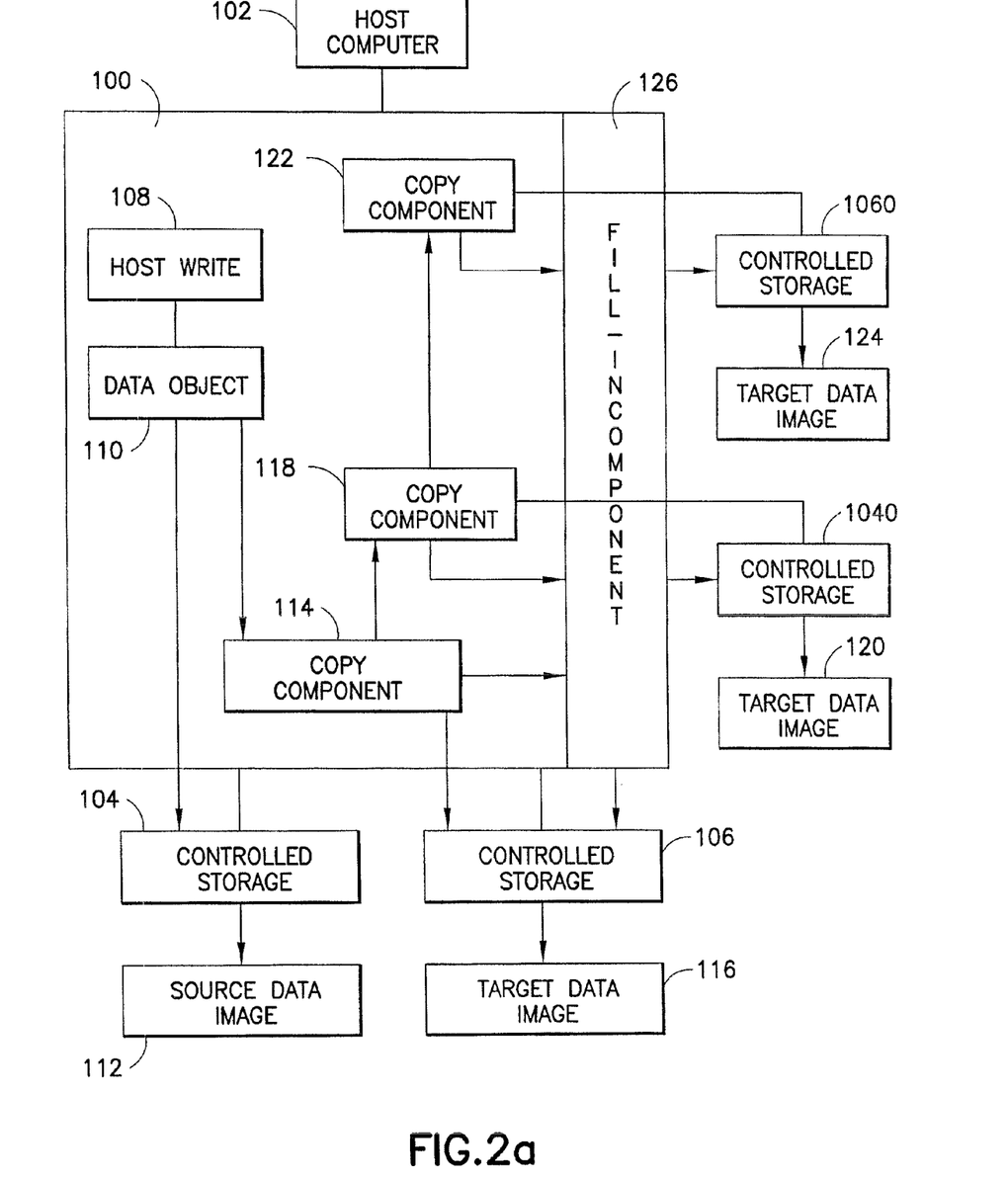
FIG. 2a is a schematic diagram illustrating a storage controller structure in which a cascade arrangement may be incorporated.

In FIG. 1 is shown a prior art data arrangement having multiple parallel targets. In an alternative, there may be provided a system, method or computer program in which host I/O activity is bounded, but cascaded copies of data are propagated to future targets without the need for host intervention. Turning now to FIG. 2a, there is shown a simplified schematic diagram of a storage controller in which a FlashCopy cascade may been implemented.

In FIG. 2a is shown a storage controller 100, cooperable with host computer apparatus 102, and a plurality of controlled storage apparatus 104, 106, 1040, 1060, and comprising: a host write component 108 operable to write a data object 110 to a source data image 112 at one of the plurality of controlled storage apparatus 104, 106, 1040, 1060; a first copy component 114 responsive to a first metadata state and operable to control copying of the data object 110 to a first target data image 116 at one of the plurality of controlled storage apparatus 104, 106, 1040, 1060; a second copy component 118 responsive to a second metadata state and operable to perform one of: controlling copying of the data object 110 to a second target data image 120 at one of the plurality of controlled storage apparatus 104, 106, 1040, 1060; and causing the first copy component 114 to perform copying of the second target data image 120 to the first target data image 116.

The controlling copying and performing copying is independent of the host computer apparatus 102 and the host write component 108; a third copy component 122 is operable to control cascaded copying of the data object 110 to a third target data image 124 at one of the plurality of controlled storage apparatus 104, 106, 1040, 1060, independently of the host computer apparatus 102, the host write component 108 and the first and second copy components 114, 118.

One of the second and the third copy components 114, 122, is operable to control cascaded copying of a delimited sequence of data images responsive to a third metadata state indicating currency of a grain of data in one of the second and the third target data images 120, 124.

The storage controller's copy components (114, 118, 122) are thus responsive to the metadata state and operable to control copying of the data object to a target data image in a delimited sequence of data images in a cascade at the controlled storage apparatus 106, 1040, 1060.

The storage controller's copy components (114, 118, 122) are in communication with fill-in component 126, which is responsive to detection of an offline condition of a disk containing the target data image, and is operable to control substitution of a fill-in disk in place of the disk containing the target data image.

Figure 2B:
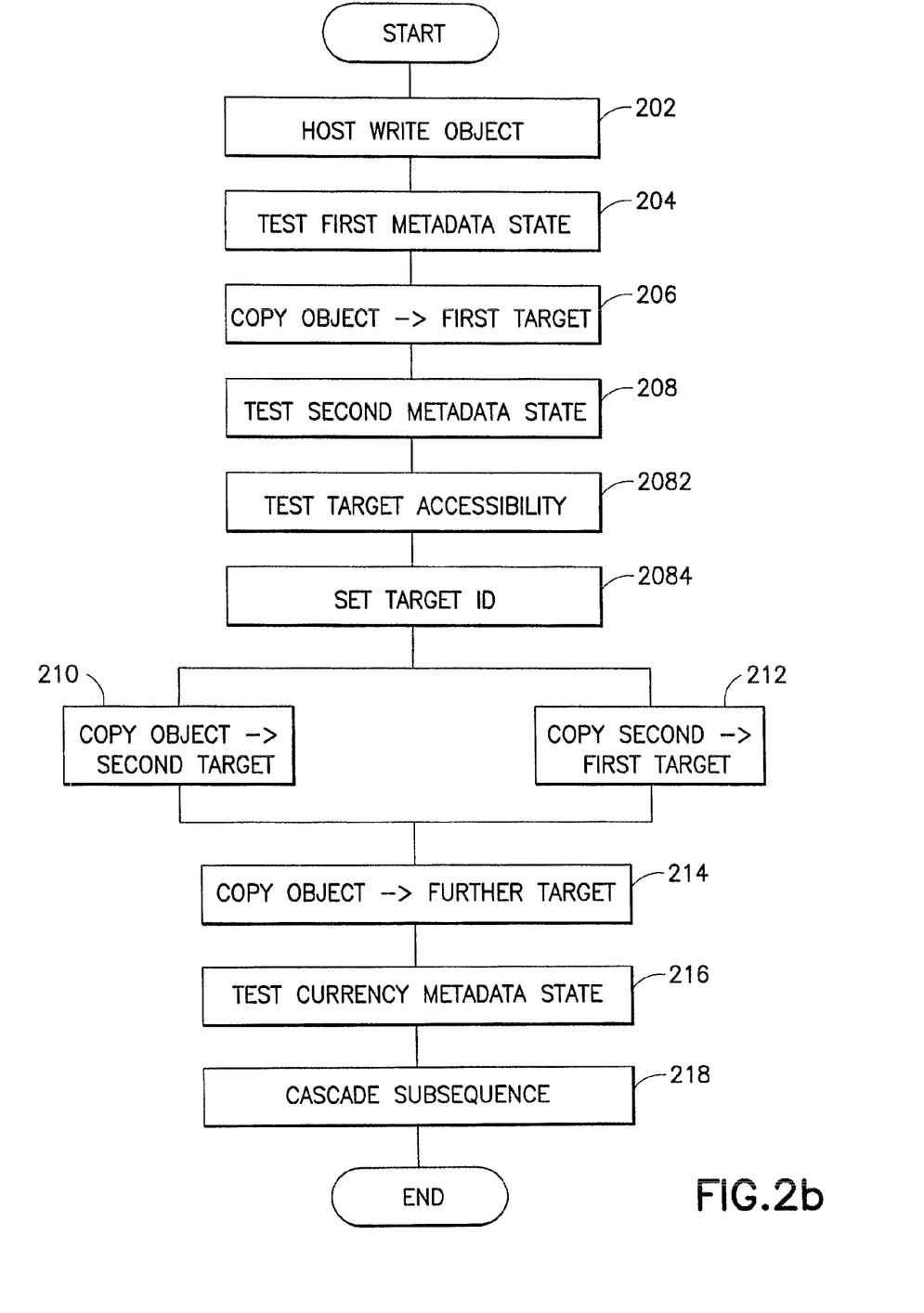
FIG. 2b is a flowchart illustrating a method of operation of storage controller to control a FlashCopy cascade.

In FIG. 2b is shown a flow diagram illustrating a method for operating a storage controller, cooperable with host computer apparatus, and a plurality of controlled storage apparatus.

At step 202, a host write component writes a data object to a source data image at one of the plurality of controlled storage apparatus. At step 204, a first copy component tests a metadata state, and responsive thereto, copies, at step 206, the data object to a first target data image at one of the plurality of controlled storage apparatus. At step 208, a second copy component tests a second metadata state, and responsive thereto, either performs, at step 210, a step of copying the data object to a second target data image at one of the plurality of controlled storage apparatus or, at step 212, causes the first copy component to perform copying of the second target data image to the first target data image.

In the exemplary embodiment of the invention shown in the flow diagram of FIG. 2b, the steps of controlling copying, by a copy component responsive to a metadata state, of said data object to a target data image in a delimited sequence of data images in a cascade at said plurality of controlled storage apparatus are subject to intervening test and set steps 2082, 2084.

If, at step 2082, an offline condition of a disk containing the target data image is detected, a fill-in component, at step 2084, causes substitution of a fill-in disk in place of the disk containing the target data image. If such a condition is not detected at step 2082, the target ID, at step 2084, is either set to the original value, or remains at the original value, depending upon implementation factors that lie beyond the scope of the present description.

The steps of testing and performing copying are independent of the host computer apparatus and the host write component. At step 214 a third copy component is in control of copying the data object to a third target data image at one of the plurality of controlled storage apparatus independently of the host computer apparatus, the host write component and the first and second copy components; and one of the second or third copy components is operable to control cascaded copying at step 218 of a delimited sequence of data images responsive to a third metadata state test at step 216 indicating currency of a grain of data in one of the second and the third target data images.

Figure 3A:
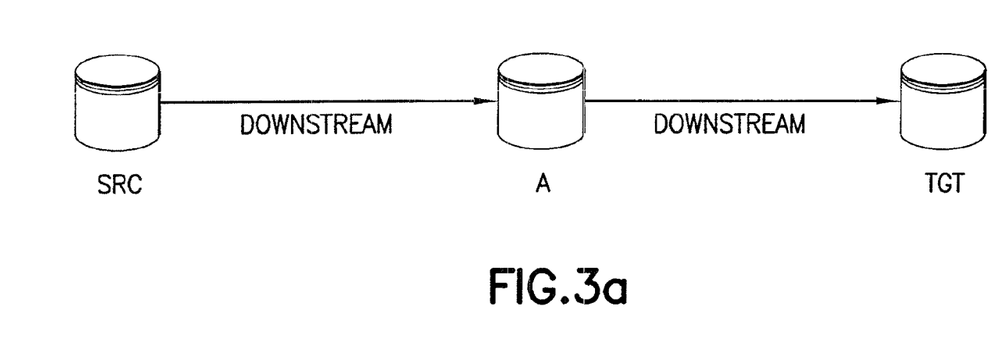
FIGS. 3a and 3b show, in simplified form, the relationships of an exemplary arrangement of disks according to a preferred embodiment of the present invention.
Figure 3B:
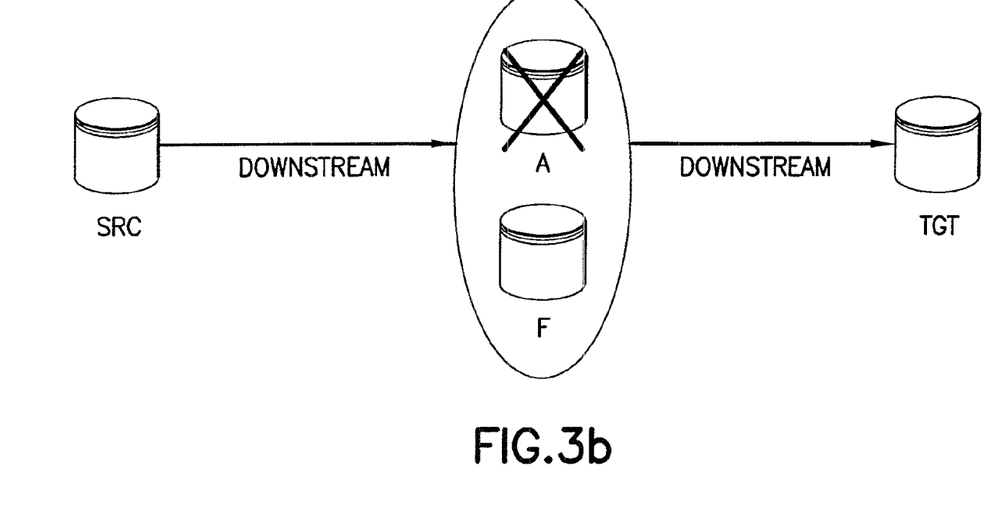

In FIG. 3a is shown an exemplary sequence of disks SRC, A and TGT in a cascade, in which A and TGT contain downstream copies in the cascade of data from SRC. FIG. 3b shows the substitution of disk F into the cascade responsive to a failure of exemplary disk A.

Below are described in more detail the structures and techniques by the use of which it is possible to maintain the required copies of original data in a cascade and to enable continued use of the cascade over a disk failure as described above.

Before describing these structures and techniques, the concept of a "grain sequence" needs to be explained. A grain sequence is a sequence of grains on consecutive disks associated with the same original data at a particular point in time.

The explanation of the operation of a cascade having sequences requires consideration of the types of data that can be on disk in the cascade at any point in time. There are four types of data that are of interest:

1) Blank Data (BD): Data that existed on a target disk prior to the FlashCopy being started.
2) Original Data (OD): Data that existed on the source disk at the point the FlashCopy was started.
3) New Data (ND): Data that was written to disk in a cascade after the FlashCopy has been started.
4) Delimiting Data (DD): The most upstream occurrence of original data.

The fact the data can be classified as four types means that each grain can be represented by 2 bits. Thus for each virtual disk in the cascade only two bitmaps are required. Indeed, for the source disk the data can only be DD or ND, and so only one bitmap, or even no bitmap at all is required, as the source disk's state can be inferred from the target disks.

Additional rules to those for cascaded FlashCopy are as follows:

A1) When a new sequence of disks is started in a cascade all the grains on the source are set to DD.
A2) If a write is made to a grain on a disk which is OD the data held on the grain is written to N disks upstream or downstream whose corresponding grain is BD and provided it does not require crossing a disk whose grain is type DD.
A3) If a write is made to a grain on a disk which is DD the data held on the grain is written to N disks downstream whose corresponding grain is BD including the next downstream disk that is BD and provided it does not require crossing a disk whose grain is type DD. Then the most upstream disk that contains OD and does not cross the disk written-to is reclassified as DD.

If a disk becomes inaccessible the following recovery actions must be performed before the cascade is protected from a second failure:

B1) For each grain, count the number of occurrences of DD and OD between disks which are DD. If the number is less than the minimum number required, perform the appropriate number of writes as described in (A2) and (A3) above. This can be done because there is at least one other copy of DD or OD in the cascade.
B2) For each grain on the inaccessible disk if the data was DD find the next downstream disk that is OD and set the grain on that disk to DD.

In this refinement of the cascade technique, the rule for a target write can be simplified to:

D1) If the data held on the grain is type BD and writing a full grain of data then simply write the new data and mark the grain as ND.

D2) If the data held on the grain is type BD and writing a partial grain of data then read the original data from the nearest copy, merge with the new data and write the merged data, then mark the grain as ND.

It will be clear to one skilled in the art that this scheme may be alternatively operated using various combinations of control bitmaps and state operations to control the cascade.

Turning now to the preferred embodiment of the present invention, an additional "Fill-in" disk is added to the disk arrangement. This disk has the normal bitmaps associated with it as if it were a normal target disk. These bitmaps are initialized to BD.

The disks in the cascade have an additional state defined: that of being accessible or inaccessible. If a disk contains data that cannot be retrieved from another disk in the cascade then it is classed as inaccessible. Thus, for the normal operation of the cascade, the following rules for client writes to target disks are introduced:

1) All target disks start as being accessible.
2) If client data is written to a target disk that is accessible then this disk is reclassified as inaccessible.
3) If a client write to a disk in the cascade results in there being only one copy of original data left in the cascade then the disk that holds the original data is reclassified as inaccessible.

Now, if a target disk in a cascade (as shown in FIG. 3), for example, disk A, fails and there is a fill-in disk, disk F, the following actions are taken:

A1) As soon as the failure of A is detected, a further rule is imposed on subsequent writes to A that have resulted from client writes to other disks. This rule governs which bitmaps to use in order to decide the state of the grain. The rule may be represented in pseudo-code as:

```
if grain on F is BD then
    use bitmaps for A
else
    use bitmaps for F
record the effect of the write (if any) in the bitmaps of F.
```

A2) The following rule is imposed on subsequent client writes to A:

```
if A is inaccessible then
    all client writes to A are failed
else
    all client writes are redirected to F and
    the bitmaps of F are changed to record the effect of the write.
```

The redirected client write operations to F are governed by bitmaps of both A and F as shown in the following table.

| | Grain state | | | |
|---|---|---|---|---|
| A/F | BD | ND | OD | DD |
| BD | action 1.1 | action 1.2 | action 1.3 | action 1.3 |
| ND | Not poss. | Not poss. | Not poss. | Not poss. |
| OD | action 1.1 | action 1.2 | action 1.3 | action 1.3 |
| DD | action 1.1 | action 1.2 | Not poss. | action 1.3 | where
"Not poss." means "Not possible" and where
1) action 1.1- If necessary, read original data from cascade and merge with client data. Write merged/client data to F. Set bitmaps of F to ND.
2) action 1.2- Write client data to F.
3) action 1.3- Read grain from F. Write original data to cascade in usual way. Write client data to F. Set bitmaps of F to ND.

A3) If A is accessible then all the data for A is held in the cascade and is accessible. Using the following table a process is started that will move all the data from A to F.

| | Grain state | | | |
|---|---|---|---|---|
| A/F | BD | ND | OD | DD |
| BD | No action | No action | No action | No action |
| ND | Not poss. | Not poss. | Not poss. | Not poss. |
| OD | action 2.1 | No action | No action | No action |
| DD | action 2.2 | No action | Not poss. | No action | where
1) action 2.1- read original data from another disk in the cascade, write to F and set the bitmaps for F to OD.
2) action 2.2- read original data from another disk in the cascade, write to F and set the bitmaps for F to DD.

A4) If the process described in A3 above finishes, disk F takes over from A permanently and the user is informed.

If A comes back online then the following events take place:

B1) The following rule is imposed on writes to A. The rule governs which bitmaps to use in order to decide the state of the grain. The rule may be represented in pseudo-code as:

```
if Grain on F is BD then
    use bitmaps for A
else
    use bitmaps for F
if required read grain from F or A (as appropriate) and merge with write data
if required, write to A
record the effect of the write (if any) in the bitmaps for A
set grain in the bitmaps for F to BD.
```

B2) All the data on F is accessible. Using the following table a process is started that will move all the data from F to A.

| | Grain state | | | |
|---|---|---|---|---|
| A/F | BD | ND | OD | DD |
| BD | No action | No action | No action | No action |
| ND | action 3.1 | Not poss. | action 3.1 | action 3.1 |

-continued

| | | Grain state | | |
|---|---|---|---|---|
| A/F | BD | ND | OD | DD |
| OD | action 3.2 | Not poss. | No action | Not poss. |
| DD | action 3.3 | Not poss. | action 3.4 | No action | where
action 3.1- read grain from F and write to A setting grain on F to BD and grain on A to ND.
action 3.2- read grain from F and write to A setting grain on F to BD and grain on A to OD.
action 3.3- read grain from F and write to A setting grain on F to BD and grain on A to DD.
action 3.4- set grain on F to BD and grain on A to DD.

B3) If the process described in B2 finishes, disk F will have all its bitmaps cleared and set ready for any further potential failure.

Based on the foregoing description it should be apparent that the present invention accordingly provides, in a first aspect, a storage controller, cooperable with host computer apparatus and a plurality of controlled storage apparatus, and comprising: a host write component operable to write a data object to a source data image at one of said plurality of controlled storage apparatus; a copy component responsive to a metadata state and operable to control copying of said data object to a target data image in a delimited sequence of data images in a cascade at said plurality of controlled storage apparatus; and a fill-in component, responsive to detection of an offline condition of a disk containing said target data image, and operable to control substitution of a fill-in disk in place of said disk containing said target data image. Preferably, the storage controller is incorporated in a storage network. Preferably, the storage network is a storage area network. Preferably, at least one of the first and the second copy components is located at a different node of a communications network. Preferably, at least one of the first and the second copy components and the further copy component is located at different nodes of a communications network.

In a second aspect, the present invention provides a method of operation of a storage controller, cooperable with host computer apparatus and a plurality of controlled storage apparatus, and comprising the steps of: writing, by a host write component, a data object to a source data image at one of said plurality of controlled storage apparatus; controlling copying, by a copy component responsive to a metadata state, of said data object to a target data image in a delimited sequence of data images in a cascade at said plurality of controlled storage apparatus; and responsive to detection of an offline condition of a disk containing said target data image, controlling, by a fill-in component, substitution of a fill-in disk in place of said disk containing said target data image.

In a third aspect, the present invention provides a computer program comprising computer program code to, when loaded into a computer system and executed thereon, cause said computer to perform the steps of a method according to the second aspect.

A preferred embodiment of the present invention provides the Fill-in Disk (F). This is preferably a disk of the same size as the other disks in the cascade. When a disk in the cascade becomes inaccessible, the map of the data held on it is still available. Thus using the fill-in disk a record of the changes that the disk in the cascade would have experienced had it been online can be kept. If the offline disk contains no new customer data, the fill-in disk can eventually replace it. This would be achieved by running a background copy on the fill-in disk which would get all the original data held on the offline disk from other copies in the cascade. If the offline disk becomes accessible again before the fill-in disk is brought up to date it can be brought up to date using the bitmaps associated with the fill-in disk. In one embodiment, client writes to the offline disks during this activity are redirected to the fill-in disks, while in an alternative they are failed back to the client.

Thus, in the preferred embodiment, access to the disk and the position of the disk in the cascade is lost only if client data has been written to the offline disk after the FlashCopy has been taken and the offline disk cannot be brought back online.

It will be readily appreciated by those of ordinary skill in the art that the preferred embodiments of the present invention may be implemented in a storage controller arranged to operate in a network of apparatus, and may comprise a storage area network controller, for example.

It will be clear to one skilled in the art that the method of the present invention may suitably be embodied in a logic apparatus comprising logic means to perform the steps of the method, and that such logic means may comprise hardware components or firmware components.

It will be equally clear to one skilled in the art that the logic arrangement of the present invention may suitably be embodied in a logic apparatus comprising logic means to perform the steps of the method, and that such logic means may comprise components such as logic gates in, for example, a programmable logic array. Such a logic arrangement may further be embodied in enabling means for temporarily or permanently establishing logical structures in such an array using, for example, a virtual hardware descriptor language, which may be stored using fixed or transmittable carrier media.

It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

It will be further appreciated that embodiments of the present invention may be provided in the form of a service deployed on behalf of a customer to offer outsourced services.

It will also be appreciated that various further modifications to the preferred embodiment described above will be apparent to a person of ordinary skill in the art.

What is claimed is:

1. A storage controller having an interface to host computer apparatus and an interface to a plurality of controlled storage apparatus, and comprising:
    a host write component operable to send a request to write a data object to a source data image at one of said plurality of controlled storage apparatus;
    a first copy component operable in response to a metadata state to control copying of said data object to a target data image in a delimited sequence of data images in a cascade at said plurality of controlled storage apparatus; and
    a fill-in component operable in response to detection of an offline condition of a disk containing said target data image to control substitution of a fill-in disk in place of said disk containing said target data image.

2. The storage controller of claim 1, wherein the storage controller is incorporated in a storage network.

3. The storage controller of claim 2, wherein the storage network is a storage area network.

4. The storage controller of claim 1, wherein at least one of the first copy component and a second copy component is located at a different node of a communications network.

5. The storage controller of claim 2, wherein a further copy component and at least one of the first copy component and a second copy component are located at different nodes of a communications network.

6. A method of operation of a storage controller having an interface to a host computer apparatus and an interface to a plurality of controlled storage apparatus, and comprising:
    writing, by a host write component, a data object to a source data image at one of said plurality of controlled storage apparatus;
    controlling copying, by a first copy component responsive to a metadata state, of said data object to a target data image in a delimited sequence of data images in a cascade at said plurality of controlled storage apparatus; and
    responsive to detection of an offline condition of a disk containing said target data image, controlling, by a fill-in component, substitution of a fill-in disk in place of said disk containing said target data image.

7. The method of claim 6, wherein the storage controller is incorporated in a storage network.

8. The method of claim 7, wherein the storage network is a storage area network.

9. The method of claim 6, wherein at least one of the first copy component and a second copy component is located at a different node of a communications network.

10. The method of claim 6, wherein a further copy component and at least one of the first copy component and a second copy component are located at different nodes of a communications network.

11. A memory that stores a computer program comprising computer program code to, when loaded into a computer and executed thereon, cause said computer to operate as a storage controller and to perform operations comprising:
    writing, by a host write component, a data object to a source data image at one of a plurality of controlled storage apparatus;
    controlling copying, by a first copy component responsive to a metadata state, of said data object to a target data image in a delimited sequence of data images in a cascade at said plurality of controlled storage apparatus; and
    responsive to detection of an offline condition of a disk containing said target data image, controlling, by a fill-in component, substitution of a fill-in disk in place of said disk containing said target data image.

12. The memory of claim 11, wherein the storage controller is incorporated in a storage network.

13. The memory of claim 12, wherein the storage network is a storage area network.

14. The memory of claim 11, wherein at least one of the first copy component and a second copy component is located at a different node of a communications network.

15. The memory of claim 11, wherein a further copy component and at least one of the first copy component and a second copy component are located at different nodes of a communications network.

* * * * *